(12) United States Patent
Minas et al.

(10) Patent No.: US 11,913,387 B2
(45) Date of Patent: Feb. 27, 2024

(54) METHOD AND APPARATUS FOR COOLING TURBINE BLADES

(71) Applicant: General Electric Company, Schenectady, NY (US)

(72) Inventors: Constantinos Minas, Slingerlands, NY (US); William Morton, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/703,546

(22) Filed: Mar. 24, 2022

(65) Prior Publication Data

US 2023/0304447 A1 Sep. 28, 2023

(51) Int. Cl.
 *F02C 9/18* (2006.01)

(52) U.S. Cl.
 CPC .......... *F02C 9/18* (2013.01); *F05D 2220/323* (2013.01); *F05D 2260/213* (2013.01); *F05D 2260/232* (2013.01); *F05D 2260/941* (2013.01); *F05D 2270/303* (2013.01); *F05D 2270/332* (2013.01); *F05D 2270/44* (2013.01); *F05D 2270/80* (2013.01)

(58) Field of Classification Search
 CPC ....................................................... F02C 9/18
 See application file for complete search history.

(56) References Cited

U.S. PATENT DOCUMENTS

| | | | |
|---|---|---|---|
| 3,475,107 A | 10/1969 | Auxier | |
| 3,566,669 A | 3/1971 | Parker | |
| 3,902,819 A | 9/1975 | Holchendler et al. | |
| 4,117,669 A | 10/1978 | Heller | |
| 5,340,274 A | 8/1994 | Cunha | |
| 6,062,811 A | 5/2000 | Zombo et al. | |
| 6,481,211 B1 | 11/2002 | Haas | |
| 7,671,338 B2 | 3/2010 | Key | |
| 7,787,996 B2 * | 8/2010 | Draper | G01M 15/14 702/34 |
| 9,494,490 B2 * | 11/2016 | Tralshawala | G01M 15/14 |
| 9,856,783 B2 | 1/2018 | Bogner et al. | |
| 10,048,133 B2 | 8/2018 | Smith et al. | |
| 2015/0176502 A1 | 6/2015 | Slavens, Jr. | |
| 2018/0347472 A1 * | 12/2018 | Ortiz | F02C 9/28 |
| 2019/0301945 A1 | 10/2019 | Wang | |

FOREIGN PATENT DOCUMENTS

| | | |
|---|---|---|
| EP | 1696102 A1 | 8/2006 |
| EP | 3106646 | 12/2016 |
| EP | 3757357 | 12/2020 |
| FR | 3129972 | 6/2023 |
| FR | 3132729 | 8/2023 |

* cited by examiner

*Primary Examiner* — Michael L Sehn
(74) *Attorney, Agent, or Firm* — Fitch, Even, Tabin & Flannery LLP

(57) ABSTRACT

A minimum creep life location (MCLL) on a blade for a turbine blade design is received. A temperature at the MCLL on the blade is monitored. When the temperature at the MCLL exceeds a predetermined threshold, a cooling air supply is adjusted to lower the temperature below the threshold during engine operation.

20 Claims, 9 Drawing Sheets

FIG. 9

METHOD AND APPARATUS FOR COOLING TURBINE BLADES

TECHNICAL FIELD

These teachings relate generally to jet engines and more particularly to the blades in the turbines of jet engines.

BACKGROUND

Creep is a temperature and stress dependent phenomenon that affects the lifetime of different structural components of an engine such as the blades of the turbine. High temperature components in a turbine often fail due to creep. Generally speaking, the higher the temperature, the faster the damage is accrued due to creep. The location on a structure which fails due to creep the fastest has the minimum creep life. This location is referred to as the minimum creep life location (MCLL). As higher and higher temperatures are realized in the engine, the turbine blades can fail as creep damage accumulation accelerates.

BRIEF DESCRIPTION OF THE DRAWINGS

Various needs are at least partially met through provision of the method and apparatus for cooling turbine blades described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Turbine blades used in jet engines can fail (e.g., become cracked, damaged, etc.) due to extreme heat. Previous approaches in preventing blade damage examined the average blade temperature across the entire blade. However, blades do not typically fail at all locations on the blade but typically only at a particular spot or area, or limited number of spots or areas resulting in inaccurate or imprecise failure predictions being made by these previous systems.

Advantageously, the present approaches for adaptive cooling of turbine blades do not rely on monitoring or determining the average temperature across a blade in making determinations as to whether to cool the blade or potentially replace the blade. Instead, the temperature of the minimum creep life location (MCLL) or the region in the immediate vicinity of the MCLL is pinpointed and its temperature monitored making the present approaches more accurate than previous approaches.

The approaches described herein define a controlled methodology, which extends the time on the wings of turbine blades. Creep life of turbine blades is a function of stress and temperature in an exponential relationship. A small increase in the temperature (e.g., 50 degrees F.) has an order of magnitude reduction in creep life (e.g., from 30 to 3 years). Creep mechanical analysis is used to determine the MCLL of the turbine blade based upon the coupled stress/temperature profile. As the engine ages, it runs at higher pressure ratio and higher temperature to maintain the same performance. The methodology is based upon monitoring the temperature of the MCLL (TMCLL). The control strategy dynamically adjusts the cooling provided to the turbine blades to keep the maximum temperature TCMLL at or below a limit value (Tlimit). The temperature can be measured directly by an infrared (IR) or other type of sensor or derived from other measurements.

Adaptive cooling can be accomplished using several approaches. One approach is to increase the flow of cooling air by opening a valve. A second method is to reduce the temperature of the cooling air by using an additional heat exchanger. For instance, the reduction in cooling air temperature is varied by controlling a valve on an additional heat exchanger.

Generally speaking, the various aspects of the present disclosure can be employed with approaches to monitor and control the operational condition of a turbine blade. In many of these embodiments, a minimum creep life location (MCLL) for a turbine blade design is received (e.g., from a designer, analytic program, or other source that has evaluated the turbine blade). The MCLL is a location as to where minimum creep life occurs on a particular turbine blade or particular turbine blade design. A temperature of the MCLL on a turbine blade having the turbine blade design in an aircraft engine is monitored (e.g., using a temperature sensor, etc.). When the temperature of the MCLL exceeds a predetermined temperature threshold, adaptive cooling is enabled to adjust the temperature and/or the amount of air flowing about the turbine blade.

In other aspects, a future prediction as to a future temperature at the MCLL is determined based upon historical data. When the future temperature of the MCLL exceeds the predetermined temperature threshold, the temperature of the air flowing about the blade is adjusted as the engine is operating.

In examples, the MCLL based upon a stress analysis and a temperature of the blade design. In aspects, the stress analysis identifies the maximum stresses at locations on the blade design and the temperature analysis identifies maximum temperatures on the blade design.

In still other aspects, the temperature of the air is adjusted by adjusting a flow rate of the air. In some examples, the air originates from the compressor and the flow rate is adjusted by a controlling a valve in the compressor. In yet other examples, the temperature of the air is adjusted using a heat exchanger.

In some other examples, the at least one sensor comprises an infrared sensor. In yet other examples, the at least one sensor is disposed on the turbine blade.

In yet others of these embodiments, a system comprises: at least one sensor, a turbine blade coupled to a rotating shaft of an aircraft engine; and a controller. The controller is coupled to the al least one sensor.

The controller is configured to receive a minimum creep life location (MCLL) for a turbine blade design. The MCLL is a location as to where minimum creep life occurs on the turbine blade design. The controller is further configured to, via the sensor, monitor the temperature of the MCLL for a turbine blade having the turbine blade design. When the temperature of the MCLL exceeds a predetermined temperature threshold, the controller is configured to send one or more first control signals to cause an adjustment of an operation of a temperature adjustment apparatus. The adjustment of the operation of the temperature adjustment apparatus is effective to cool a temperature of air flowing about the turbine blade as the aircraft engine is operating.

In other aspects, the controller is configured to determine a future prediction as to a future temperature at the MCLL based upon historical data; and when the future temperature at the MCLL exceeds the predetermined temperature threshold, send one or more second control signals to the temperature adjustment apparatus to adjust the temperature of the air flowing about the turbine blade as the aircraft engine is operating.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Figure 1:
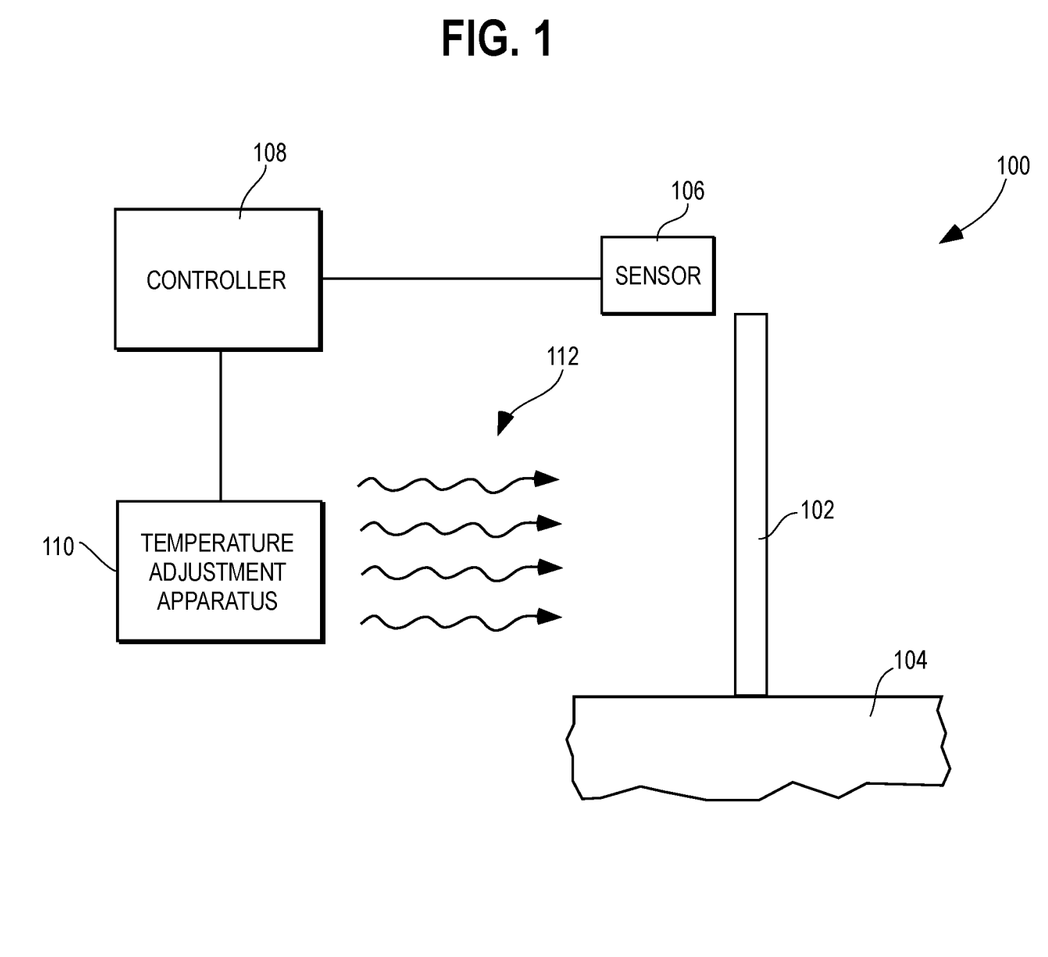
FIG. 1 comprises a diagram as configured in accordance with various embodiments of these teachings.

Referring now to FIG. 1, one example of a system 100 for adaptively cooling blades in a gas turbine engine is described. The system 100 includes a blade 102 coupled to a shaft 104 present in the engine. In examples, the blade 102 and shaft 104 may be disposed in the turbine section of the gas turbine engine. A sensor 106 is coupled to a controller 108. The controller 108 is coupled to a temperature adjustment apparatus 110. The temperature adjustment apparatus 110 produces cooling air 112 that adaptively cools the blade 102. It will be appreciated that the blade 102 may be one blade on a disk of blades and that as the shaft rotates, the disk rotates, thereby rotating the blade 102.

The blade 102 is any blade such as a rotor blade in the turbine section of the gas turbine engine (e.g., an aircraft engine). The shaft 104 is coupled to the blade 102 and rotates. As the shaft 104 rotates, the blade 102 rotates. It will be appreciated that the blade 102 may be constructed using different materials and may have different sizes, dimensions, and shapes according to the needs of a particular gas turbine engine. It will also be understood that the turbine section of the engine consists of several stages with each stage typically having a different blade design.

The sensor 106 is any type of sensor that obtains the temperature of the environment in which the blade 102 is operating. In one example, the sensor 106 is an infrared sensor. Other examples of sensors are possible. The sensor 106 may need to be positioned (aimed) to sense the temperature of a MCLL. In other examples, the sensor 106 has a field of view or sensing field that covers (e.g., obtains an image that shows or indicates temperatures) over larger areas often blade 102 and the controller 108 processes the sensed image or data to determine the temperature of the MCLL within that image or data. In this later example, the sensor 106 is disposed as to be able to sense the entire or larger areas of the blade 102.

The controller 108 is coupled to the sensor 106. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 108 may be configured (for example, by using corresponding programming stored in a memory as will be well understood by those skilled in the art) to carry out one or more of the steps, actions, and/or functions described herein.

In aspects, the temperature adjustment apparatus 110 is configured to adaptively adjust the temperature of the air by adjusting a flow rate of the air. For example, the temperature adjustment apparatus comprises a valve, and the flow rate of air flowing through the valve is adjusted by applying the one or more first control signals to the valve. In other examples, the temperature adjustment apparatus comprises a heat exchanger.

In operation, the design of the blade 102 is obtained. The design of the blade 102 is represented electronically in some electronic form, model, or file. The boundary conditions of the blade 102 are obtained and the conditions include dimensions, thickness, ambient temperature to mention a few examples. Other characteristics such as material type and strength of the blade 102 are also obtained. For example, the boundary conditions are obtained from the designers of the blade and in one specific example include a blade of a specified shape, thickness, the material used to construct the blade.

The blade 102 may be one blade in a turbine section of the gas turbine engine. The turbine section may comprise multiple stages or sections. Each stage may be a disk with multiple blades on the disk and stationary vanes positioned between each disk. The blade 102 may be associated with one of the disks. Each disk has multiple blades (including the blade 102) that rotate. There is also a non-moving section of vanes that is formed with the casing of the gas turbine engine and the vanes direct air flow through the turbine stage. One stage might have 42 blades and the other 46 blades.

In one example, there is one sensor per stage, not one sensor per blade. In other examples, multiple sensors can be used for each of the turbine stages.

A stress diagram for the design of the blade 102 showing stresses on the design of the blade 102 is generated according to approaches known to those skilled in the art. For example, Finite Element Analysis software (for example, as developed by ANSYS corporation) can be used to create the stress distribution along the blade. Given certain operating conditions, a temperature diagram showing the maximum temperatures on the blade 102 is generated according to approaches known to those skilled in the art. For instance, Finite Element Analysis software can be used to create the temperature distribution along the blade.

The MCLL for the design of the blade 102 is determined using the stress diagram and the temperature diagram. This is for a particular blade model and design. In examples, it is assumed the MCLL will not change during operation or does so minimally (e.g., it moves a distance with approximately one percent of the length of the blade).

This process can be performed as follows. The Larson Miller parameter (LMP) is defined as:

LMP=T (Log(tr)+C), where tr is the rupture or failure time and represents the creep life, T is the temperature in degrees Kelvin and C is a constant dependent upon materials or other characteristics of the blade 102.

The maximum stress is determined for a point on the design of the blade 102 using the stress diagram. A known graph of LMP versus stress is obtained (e.g., this may be supplied by the manufacturer of the blade 102). The LMP is related to the material used to construct the blade 102. With the maximum stress known for this point of the blade, with C known, and with maximum temperature for this point on the blade 102 known, the minimum creep life for this point on the blade is determined by solving the above-mentioned equation for tr. This process is performed for all points on the blade 102 so that the minimum creep life location is determined (by determining lowest tr across all points on the blade 102).

The controller 108 now performs the monitoring of the temperature of the MCLL. The controller 108 uses the sensor 106 (e.g., an infrared sensor or optical sensor) to monitor the temperature of the MCLL as the blade 102 turns. The controller 108 and sensor 106 can be configured to monitor only one MCLL for the blade 102 (e.g., the sensor 106 is on the blade 102, or, as the blade 102 turns, the sensor 106 senses the blade 102) and may assume that all blades of the disk have the same MCLL. In other examples, multiple blades may be monitored by the controller 108 and the sensor 106. This monitoring loop is continuous, but the controller 108 may sense at different points in time, for example.

In aspects, the controller 108 also determines whether in the future the temperature at the MCLL will be exceeded. To do this, the controller 108 examines the trend (slope of a pattern) of past (or historical) data to determine when in the future the temperature at the MCLL would be exceeded. For example, if over each predetermined time period, the temperature was 250 degrees F., 300 degrees F., then 350 degrees F., the controller 108 may infer that the temperature of the MCLL would rise to 400 degrees F. over the next time period.

When the temperature of the MCLL exceeds a threshold, various actions can be used to cool the blade 102 and the MCLL. Air can be bled from the compressor of the gas turbine engine and applied to the blade 102. The air that is bled may be referred to as cold cooling air (CCA) and may be measured in kg/minute. Bleeding air may be controlled by a valve in the temperature adjustment apparatus 110 and this applies cooler air to the blade 102. At one point, 10% of the air may be bled from the compressor, while at other points 15% may be bled from the compressor. A control signal from the controller 108 may be used to control the valve. In systems with multiple turbine sections, a certain percentage of bled air may be routed to different ones of the turbine stages or sections.

When the temperature adjustment apparatus 110 is or includes a heat exchanger, the air is cooled by the heat exchanger and returned in a cooler state. In one example, the cooled air is returned 20% cooler than the air before cooling. In other examples, the air is cooled to a temperature 30% cooler. It will be appreciated that these are only examples and that any amount of cooling is possible.

In other examples, cooling air is targeted to the MCLL where only the portion of the blade with the MCLL is cooled. This might be directed with special pipes, vanes, or adjustments to other structures.

Figure 2:
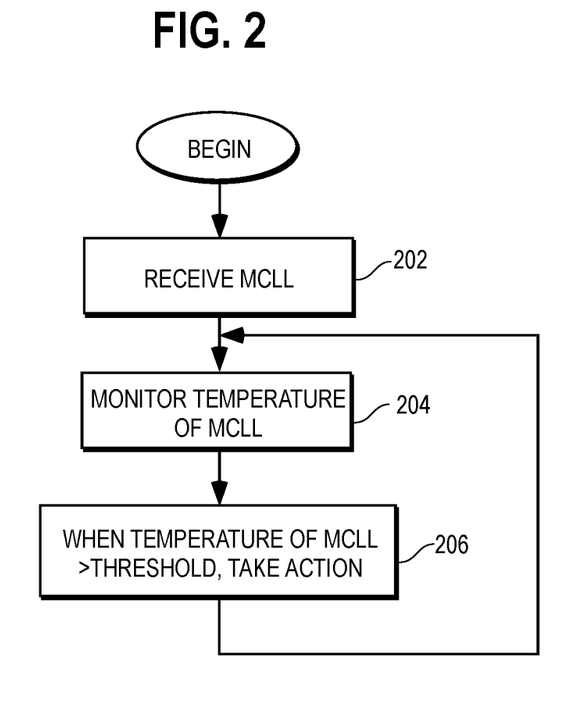
FIG. 2 comprises a flow diagram as configured in accordance with various embodiments of these teachings.

Referring now to FIG. 2, one example of an approach for cooling turbine blades is described. At step 202, a minimum creep life location (MCLL) for a turbine blade design is received. The MCLL is a location on the turbine blade design as to where minimum creep life occurs.

At step 204, a temperature of the MCLL on a turbine blade having the turbine blade design in an aircraft engine is monitored. The monitoring may be made using an infrared or optical sensor. In examples, this sensor obtains images (which show temperature) or other sensed readings across the entire blade or large portions of the blade (>80% of the blade) and these images or data are processed to find the temperature at the MCLL.

At step 206 and when the temperature of the MCLL exceeds a predetermined temperature threshold, a temperature of air flowing about the turbine blade is adjusted as the aircraft engine is operating. In examples, a heat exchanger is used.

Figure 3:
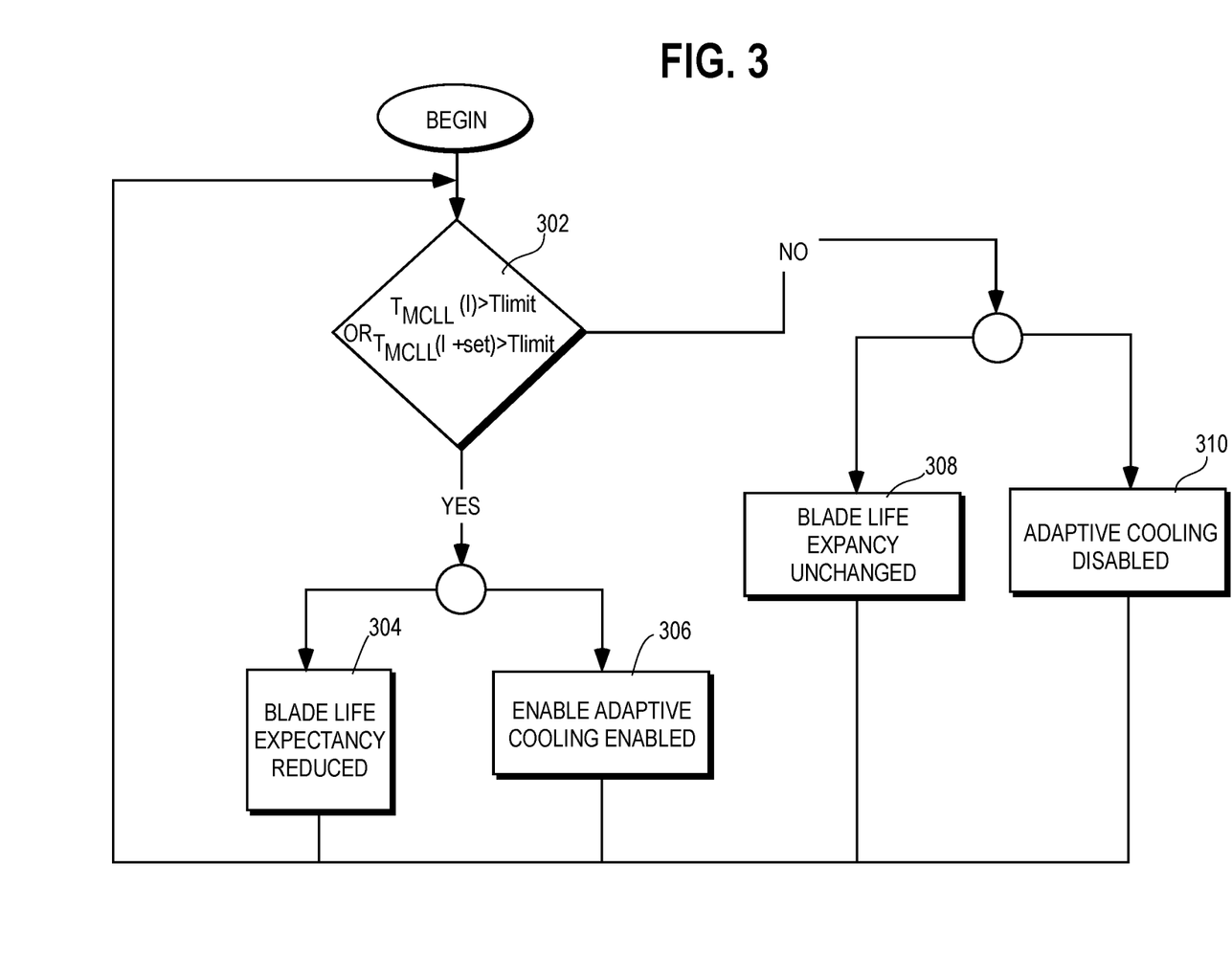
FIG. 3 comprises a flow diagram as configured in accordance with various embodiments of these teachings.

Referring now to FIG. 3, another example of an approach for cooling turbine blades is described. At step 302, it is determined if the temperature of the MCLL of a blade at time i (Tmcll(i)) is greater than a threshold (Tlimit) or the temperature of the MCLL of a blade at a future time (Tmcll(i)+tset) is greater than a threshold (Tlimit). The temperature of the MCLL of the blade at the future time may be, in examples, predicted by the controller 108 using knowledge of how the temperature of the MCLL as measured is changing. For instance, if the temperature of the MCLL is changing in a linear way, and is at a certain temperature at time I, it can be extrapolated what a future temperature would be by the controller 108.

If the answer is affirmative, then, at step 304, it is determined that the blade life expectancy is reduced and at step 306 the adaptive cooling procedures described herein are enabled. Besides utilizing the adaptive cooling approaches described herein, plans may be made to replace or service the blade during a maintenance period during which these actions can be performed.

If the answer is negative, then, at step 308, it is determined that the blade life expectancy is unchanged, and, at step 310, the adaptive cooling procedures described herein are disabled. These cooling procedures may be disabled manually or automatically.

Figure 4:
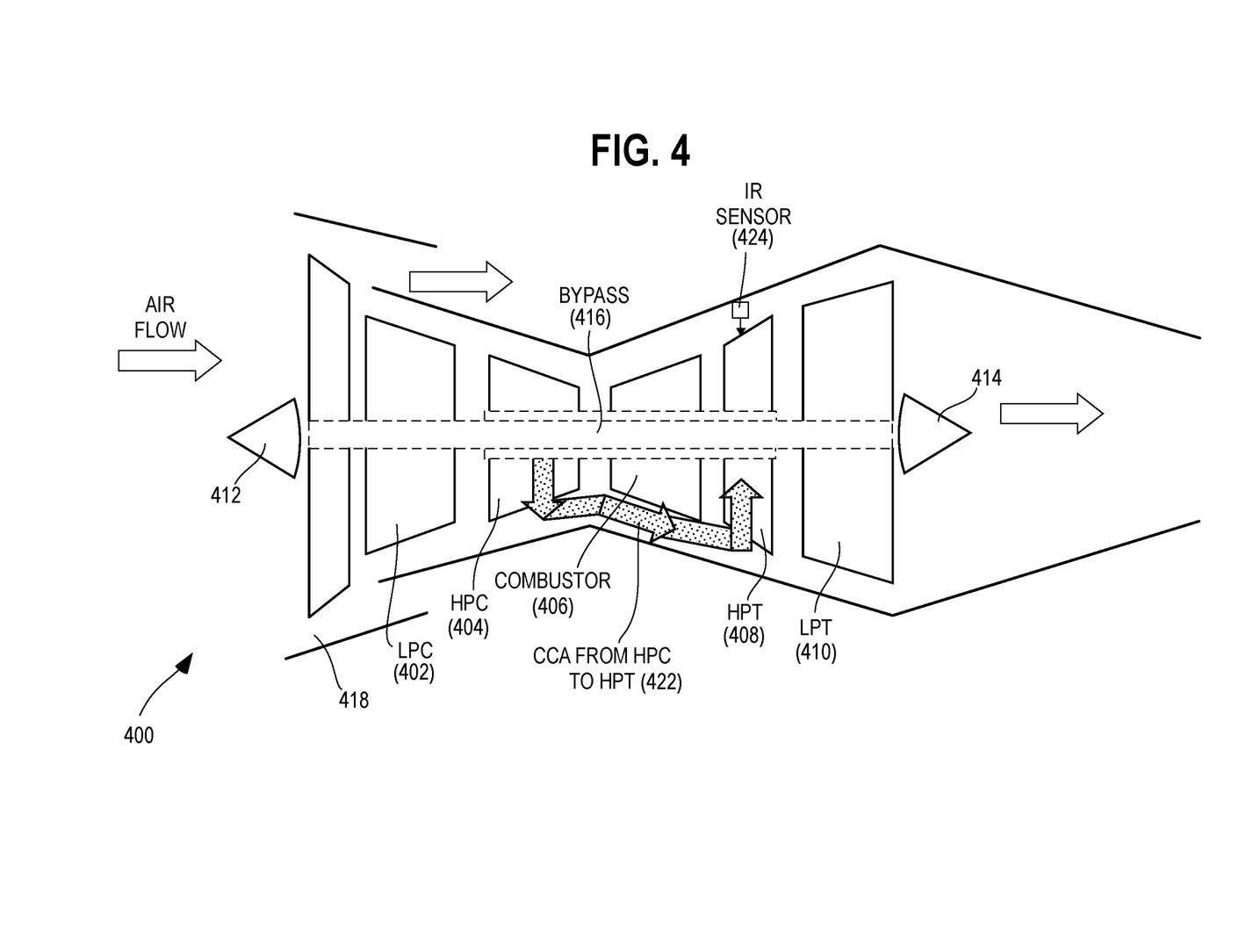
FIG. 4 comprises a diagram as configured in accordance with various embodiments of these teachings.

Referring now to FIG. 4, one example of a system for cooling the blades of an engine 400 is described. The engine 400 (e.g., a gas turbine engine of an aircraft) includes a low-pressure compressor (LPC) stage 402, a high-pressure compressor (HPC) stage 404, a combustor 406, a high-pressure turbine (HPT) stage 408, and a low-pressure turbine (LPT) stage 410. A first nozzle 412 guides air into the engine 400 and a second nozzle 414 guides air out of the engine 400. A first bypass 416 and a second bypass 418 guide air around the engine 400. Air is compressed by the LPC stage 402 and the HPC stage 404, and is ignited with fuel in the combustor 406, which turns blades in the HPT stage 408 and the LPT stage 410 to produce thrust.

In the present approaches, CCA 422 from the HPC stage 404 is guided to the HPT stage 408. As mentioned, one or more valves may control the flow of the CCA 422. A heat exchanger (not shown) may also be used to create (or in some cases further cool) the CCA 422. In the approaches provided herein, a sensor 424 senses the temperature of the MCLL of one or more blades in the HPT stage 408 and adjusts a valve to release more or less of the CCA 422 to cool the blades in the HPT stage 408 as appropriate. Although not shown in FIG. 4, these same approaches may be used to cool blades in the LPT stage 410.

Figure 5:
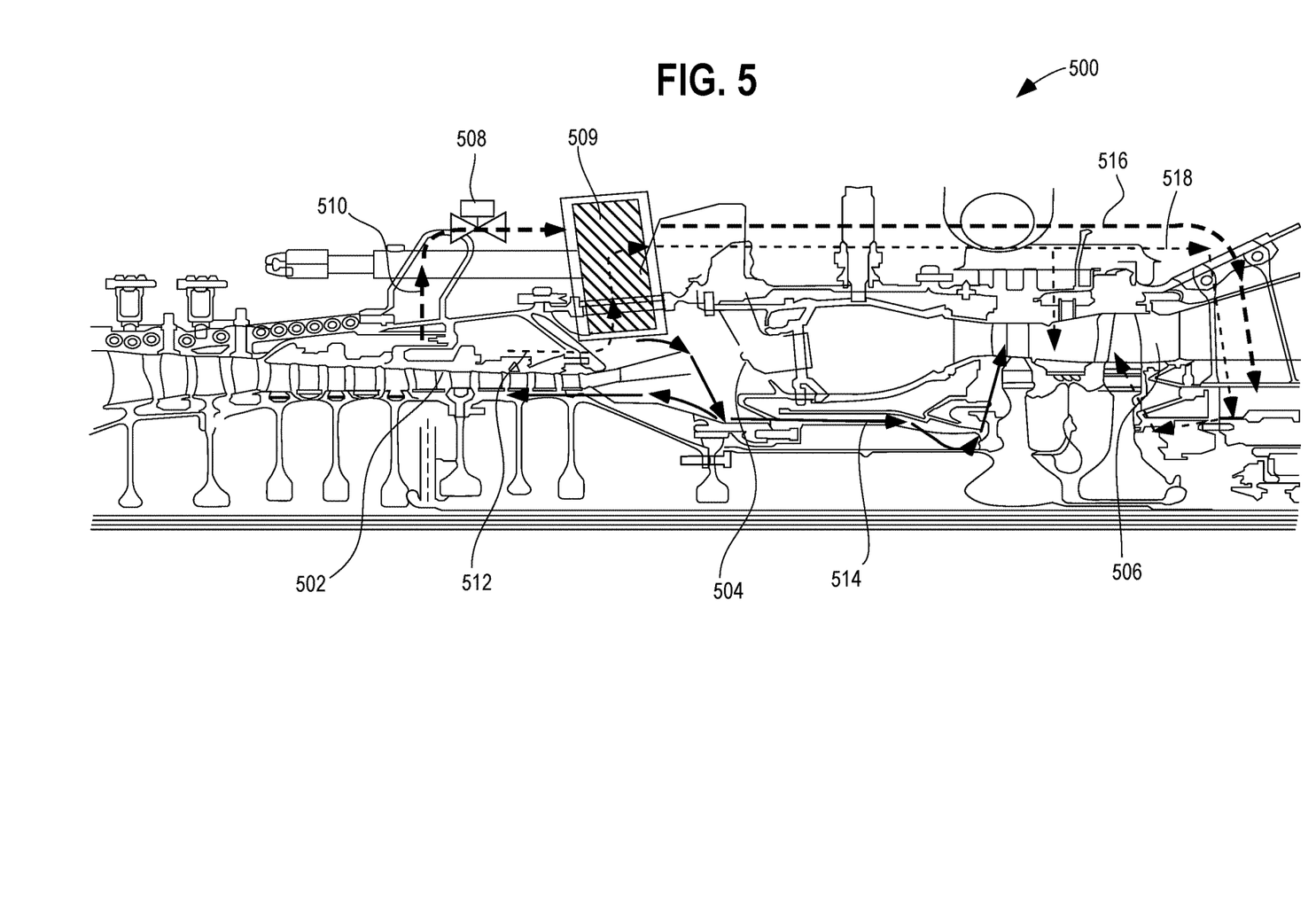
FIG. 5 comprises a diagram as configured in accordance with various embodiments of these teachings.

Referring now to FIG. 5, one example of a system for cooling the blades of an engine 500 is described. The engine 500 is a gas turbine engine as used in an aircraft and includes compressor stages 502, a combustion stage 504, and turbine stages 506. A proportional valve 508 bleeds air 510 from the compressor stages 502 to a heat exchanger 509. The heat exchanger 509 receives air of one temperature and outputs air of a lower temperature. In this case, the heat exchanger 509 produces CCA 516 and CCA 518, which are applied to different ones of two sections of the turbine stages 506. In other examples, the heat exchanger 509 is omitted, and the proportional valve 508 produces a single stream of CCA that can be applied to different ones of the turbine stages 506. The amount of opening of the proportional valve 508 is control with a control signal provided from a controller (e.g., controller 108 described in FIG. 1).

An air flow 512 from the compressor stages 502 also flows to the heat exchanger 509 as well as to the turbine stages 506. CCA 514 flows from the compressor stages 502 to the turbine stages 506. An amount of the CCA 514 may be controlled by a second proportional valve (not shown) or may flow directly. The CCA 516, the CCA 518, the CCA 514, the air 510, and the air 512 may be directed with pipes or other guiding structures in the engine 500.

Figure 6A:
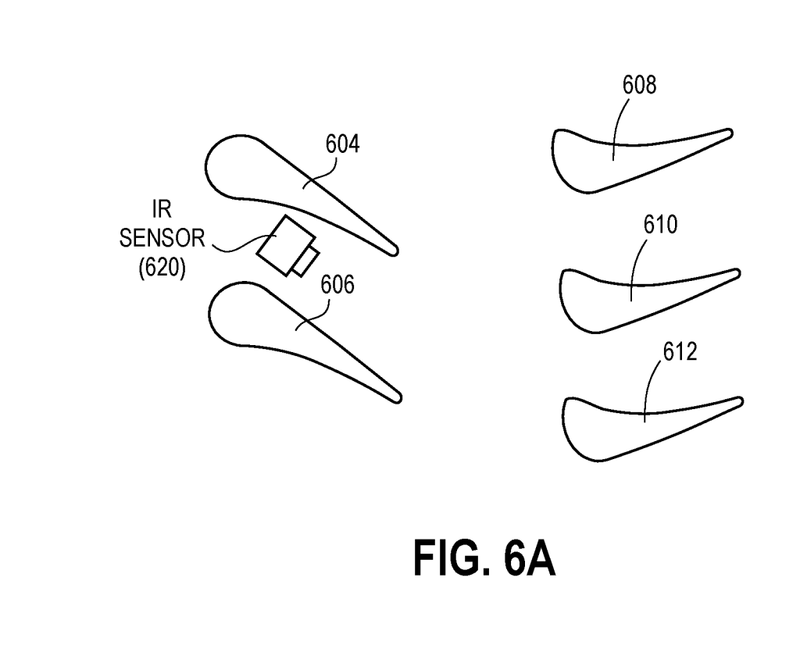
FIGS. 6A and 6B comprises diagrams as configured in accordance with various embodiments of these teachings.
Figure 6B:
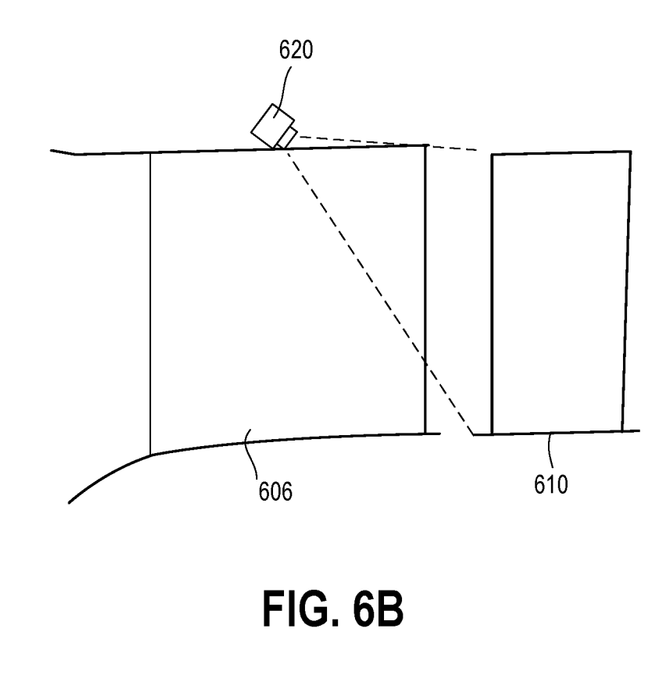

Referring now to FIG. 6A is a view of vanes and blades in a turbine section of an engine looking from the top. FIG. 6B is an axial cross-sectional view looking from the side of the engine. In both cases, vanes 604 and 606, and blades 608, 610, and 612 are shown. It will be appreciated that other vanes and blades are typically present but have been omitted from these figures for simplicity.

An infrared sensor 620 is configured to sense the temperature of one or more of the blades 608, 610, and 612, in this example, the blade 610. The temperature sensed is the temperature of a MCLL on the blade 610. In some aspects, the angle, position, and view of the infrared sensor 620 is automatically or manually adjusted so that the temperature of the MCLL of the blade 610 can be detected. In these respects, the infrared sensor 620 may sense a point location on the blade 610 or in a region about the MCLL.

In other examples, the infrared sensor 620 senses a wider field of view that includes the temperature of the MCLL but also temperatures of other blade locations. A controller can analyze this information to determine the temperature of the MCLL and ignore the temperatures of other non-MCLL points.

The temperature of each MCLL for each blade (each of the blades 608, 610, and 612) may be sensed or the MCLL of only one blade may be sensed and it may be assumed that the temperature of the MCLL of this single blade applies to each MCLL of all the other blades.

Figure 7:
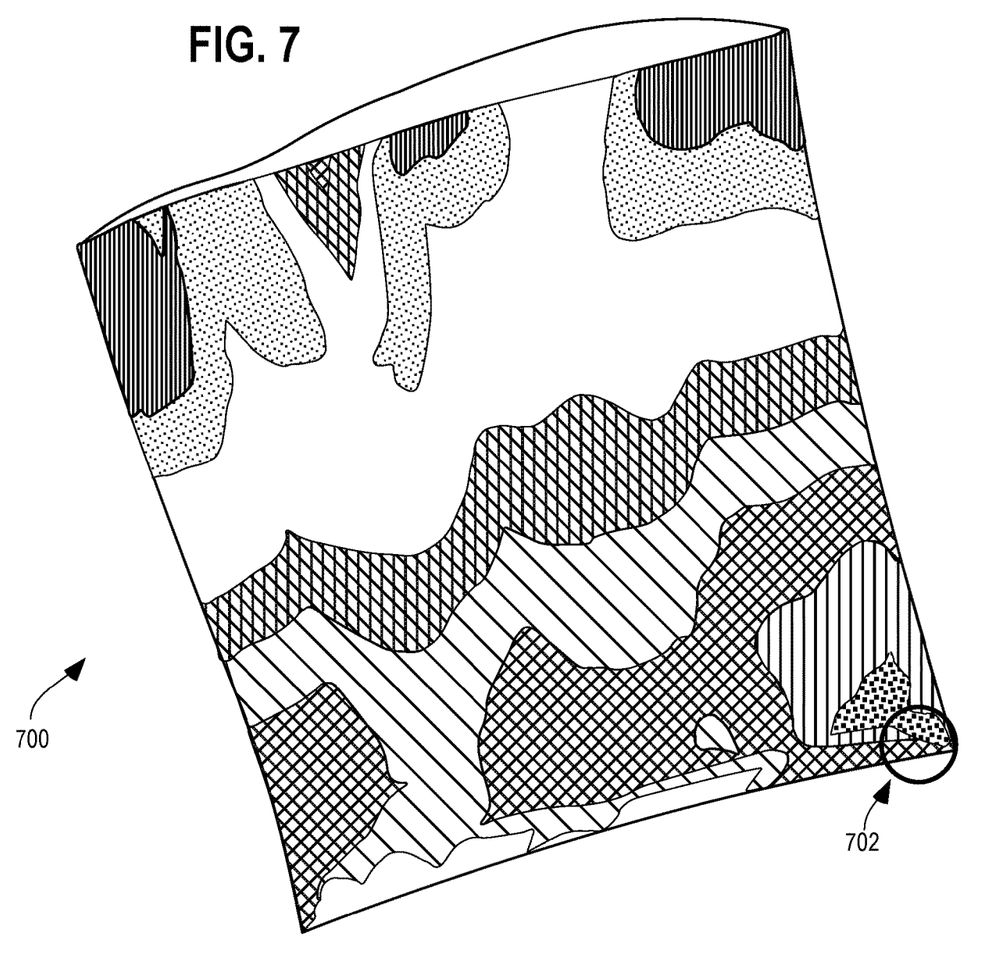
FIG. 7 comprises a diagram as configured in accordance with various embodiments of these teachings.

Referring now to FIG. 7, one example of a stress diagram (or map) of a blade 700 is described. The blade 700 includes a variety of different shaded regions each with different maximum stresses as measured in any appropriate stress unit. The maximum stress is indicated by a point (or region about a point) 702. The values in this diagram are calculated according to approaches known to those skilled in the art given the dimensions, size, materials, and shape of the blade 700. The information in the stress diagram is used to determine the MCLL as described with respect to FIG. 9.

Figure 8:
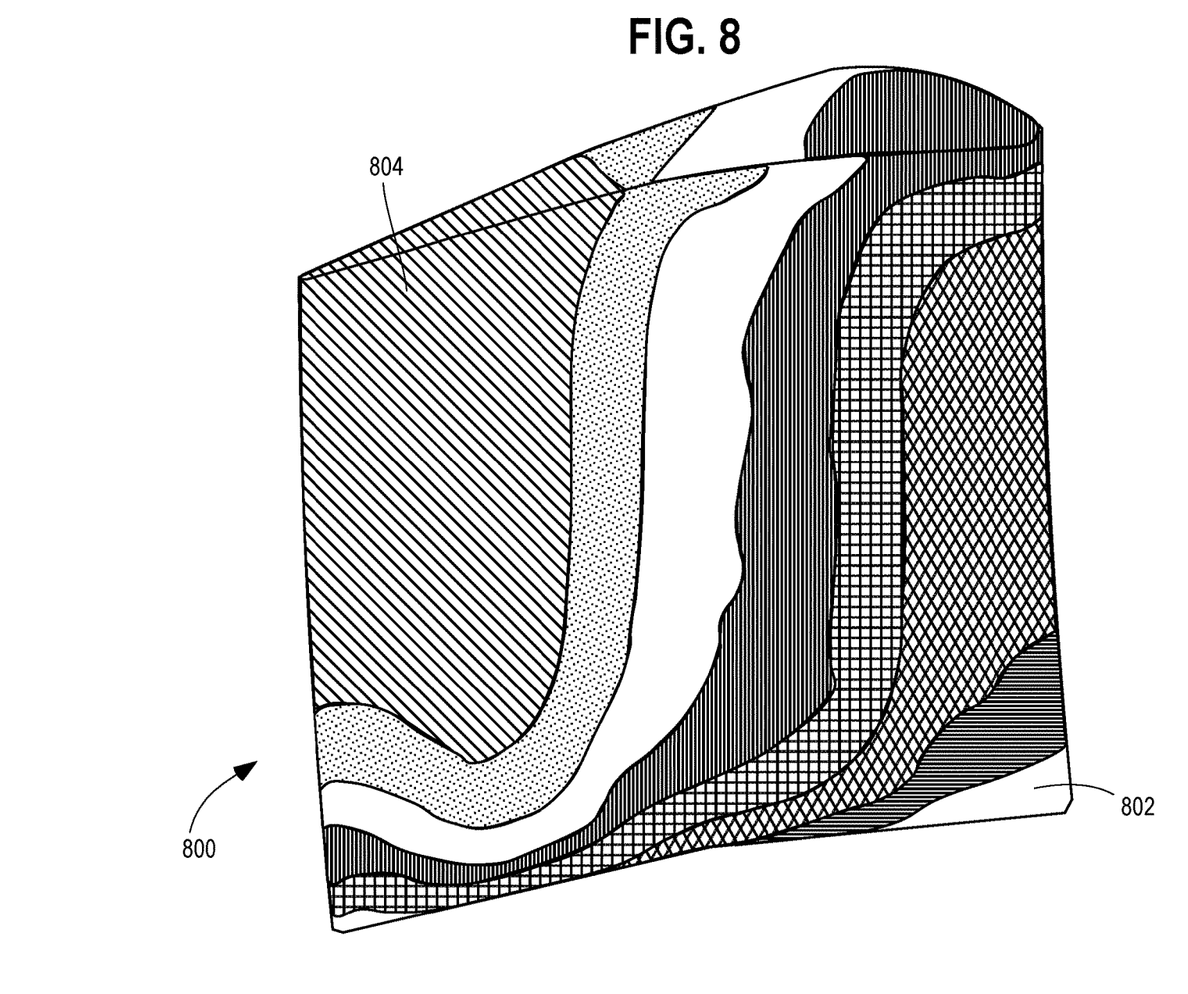
FIG. 8 comprises a diagram as configured in accordance with various embodiments of these teachings.

Referring now to FIG. 8, one example of a temperature diagram (or map) of a blade 800 is described. The blade 800 includes a variety of different shaded regions each with different maximum temperatures as measured in any appropriate temperature unit. The maximum temperature is indicated by a point (or region about a point) 802 and the minimum temperature indicated by a point 804. The values in this map are calculated according to approaches known to those skilled in the art given the dimensions, size, materials, and shape of the blade 800. The information in the temperature diagram is used to determine the MCLL as described with respect to FIG. 9.

Figure 9:
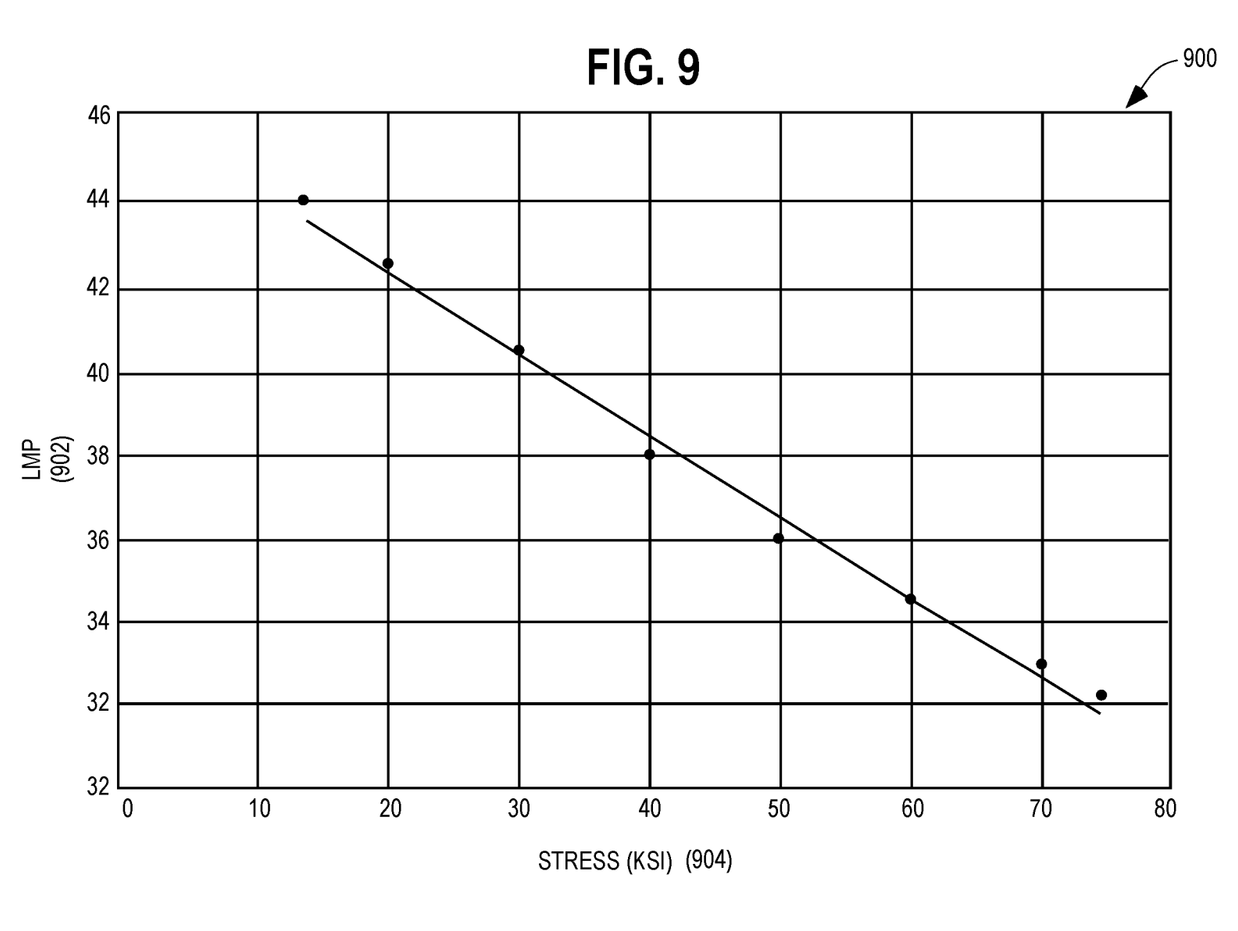
FIG. 9 comprises a diagram as configured in accordance with various embodiments of these teachings.

Referring now to FIG. 9, one example of calculating the MCLL is described. The Larson Miller parameter is:

$LMP = T(Log(tr)+C)$, where tr is the rupture or failure time, and T is the temperature in degrees Kelvin and C is a constant. A known graph 900 of LMP 902 versus maximum stress 904 is obtained. With the maximum stress 904 known for a particular point on the blade (for example, using the stress diagram of FIG. 7), the LMP 902 is determined. For example, a maximum stress of 20 corresponds to a LMP of around 42.5. With C known and with maximum temperature for a point known (e.g., from the temperature diagram of FIG. 8), the minimum creep life for a location is determined for the point by solving the equation $LMP = T(Log(tr)+C)$ for tr.

This process is performed for all points on the blade to yield a large number or set of tr values. The minimum creep life location is determined by finding the minimum number for tr from the set and this minimum value of tr will be associated with particular point on the blade, which will become the MCLL.

Advantageously, the present approaches for adaptive cooling of turbine blades do not rely on monitoring or determining the average temperature across a blade in making determinations as to whether to cool the blade or potentially replace the blade. Instead, the temperature of the minimum creep life location (MCLL) or the region in the immediate vicinity of the MCLL is pinpointed and its temperature monitored making the present approaches more accurate than previous approaches.

It should be understood that the controllers (e.g., the controller 108) provided herein may implement the various functionality described herein. In terms of hardware architecture, such a controller can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in a memory. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The controllers may implement the functions described herein in any combination of hardware and software (e.g., with the software being executed by a controller). The software may be stored in any memory device and may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a controller such as a microprocessor. However, as mentioned, these approaches can be implemented as any combination of electronic hardware and/or software.

Further aspects of the invention are provided by the subject matter of the following clauses:

A method for controlling the operational condition of a turbine blade, the method comprising: receiving a minimum creep life location (MCLL) for a turbine blade design, the MCLL being a location as to where minimum creep life occurs on the MCLL on the turbine blade design; monitoring a temperature of the MCLL on a turbine blade having the turbine blade design in an aircraft engine; and when the temperature of the MCLL exceeds a predetermined temperature threshold, adjusting a temperature of air flowing about the turbine blade as the aircraft engine is operating.

The method of any preceding clause, further comprising determining a future prediction as to a future temperature at the MCLL based upon historical data and when the future temperature of the MCLL exceeds the predetermined temperature threshold, adjusting the temperature of the air flowing about the blade as the engine is operating.

The method of any preceding clause, further comprising determining the MCLL based upon a stress analysis and a temperature of the blade design.

The method of any preceding clause, wherein adjusting the temperature of the air comprises adjusting a flow rate of the air.

The method of any preceding clause, wherein the air originates from the compressor.

The method of any preceding clause, wherein the flow rate is adjusted by a controlling a valve in the compressor.

The method of any preceding clause, wherein adjusting the temperature of the air comprises cooling the air with a heat exchanger.

The method of any preceding clause, wherein the at least one sensor comprises an infrared sensor.

The method of any preceding clause, wherein the at least one sensor is disposed on the turbine blade.

A system, comprising: at least one sensor, a turbine blade coupled to a rotating shaft of an aircraft engine; a controller, the controller coupled to the at least one sensor, the controller being configured to: receive a minimum creep life location (MCLL) for a turbine blade design, the MCLL being a location as to where minimum creep life occurs on the turbine blade design; via the sensor, monitor the temperature of the MCLL for a turbine blade having the turbine blade design; when the temperature of the MCLL exceeds a predetermined temperature threshold, send one or more first control signals to cause an adjustment of an operation of a temperature adjustment apparatus, the adjustment of the operation of the temperature adjustment apparatus being effective to cool a temperature of air flowing about the turbine blade as the aircraft engine is operating.

The system of any preceding clause, wherein the controller is configured to: determine a future prediction as to a future temperature at the MCLL based upon historical data; and when the future temperature at the MCLL exceeds the predetermined temperature threshold, send one or more second control signals to the temperature adjustment apparatus to adjust the temperature of the air flowing about the turbine blade as the aircraft engine is operating.

The system of any preceding clause, wherein the MCLL is determined based upon a stress analysis and a temperature of the blade design.

The system of any preceding clause, wherein the temperature adjustment apparatus is configured to adjust the temperature of the air by adjusting a flow rate of the air.

The system of any preceding clause, wherein the temperature adjustment apparatus comprises a valve.

The system of any preceding clause, wherein the flow rate is adjusted by a applying the one or more first control signals to a valve of the compressor.

The system of any preceding clause, wherein the temperature adjustment apparatus comprises a heat exchanger.

The system of any preceding clause, wherein the at least one sensor comprises an infrared sensor.

The system of any preceding clause, wherein the at least one sensor is disposed on the turbine blade.

A non-transitory, machine-accessible storage medium having computer instructions and wherein the instructions are configured, when executed by a controller, to cause the controller to: receive a minimum creep life location (MCLL) for a turbine blade design, the MCLL being a location at which minimum creep life occurs on the turbine blade design; monitor a temperature of the MCLL on a turbine blade having the turbine blade design in an aircraft engine using at least one sensor; and when the temperature of the MCLL exceeds a predetermined temperature threshold, adjust a temperature of air flowing about the turbine blade as the aircraft engine is operating.

The non-transitory, machine-accessible storage medium of any preceding clause wherein the controller is configured to determine a future prediction as to a future temperature at the MCLL based upon historical data and when the future temperature of the MCLL exceeds the predetermined temperature threshold, adjust the temperature of the air flowing about the turbine blade as the aircraft engine is operating.

The non-transitory, machine-accessible storage medium of any preceding clause, further comprising determining the MCLL based upon a stress analysis and a temperature of the blade design.

The non-transitory, machine-accessible storage medium of any preceding clause, wherein adjusting the temperature of the air comprises adjusting a flow rate of the air.

The non-transitory, machine-accessible storage medium of any preceding clause, wherein the air originates from the compressor.

The non-transitory, machine-accessible storage medium of any preceding clause, wherein the flow rate is adjusted by controlling a valve in the compressor.

The non-transitory, machine-accessible storage medium of any preceding clause, wherein adjusting the temperature of the air comprises cooling the air with a heat exchanger.

The non-transitory, machine-accessible storage medium of any preceding clause, wherein the at least one sensor comprises an infrared sensor.

The non-transitory, machine-accessible storage medium of any preceding clause, wherein the at least one sensor is disposed on the turbine blade.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for controlling an operational condition of a turbine blade, the method comprising:
   determining a minimum creep life location (MCLL) for a turbine blade design, the MCLL being a location at which minimum creep life occurs on the turbine blade design that fails fastest due to creep;
   monitoring a temperature of the MCLL on a turbine blade having the turbine blade design in an aircraft engine using at least one sensor; and
   when the temperature of the MCLL exceeds a predetermined temperature threshold, adjusting a temperature of air flowing about the turbine blade as the aircraft engine is operating.

2. The method of claim 1, further comprising determining a future prediction as to a future temperature at the MCLL based upon historical data and when the future temperature of the MCLL exceeds the predetermined temperature threshold, adjusting the temperature of the air flowing about the turbine blade as the aircraft engine is operating.

3. The method of claim 1, further comprising determining the MCLL based upon a stress analysis and a temperature of the turbine blade design.

4. The method of claim 1, wherein adjusting the temperature of the air flowing about the turbine blade comprises adjusting a flow rate of the air flowing about the turbine blade.

5. The method of claim 4, wherein the air flowing about the turbine blade originates from a compressor of the aircraft engine.

6. The method of claim 5, wherein the flow rate of the air flowing about the turbine blade is adjusted by controlling a valve.

7. The method of claim 1, wherein adjusting the temperature of the air flowing about the turbine blade comprises cooling the air with a heat exchanger.

8. The method of claim 1, wherein the at least one sensor comprises an infrared sensor.

9. The method of claim 1, wherein the at least one sensor is disposed on the turbine blade.

10. A system, comprising:
    at least one sensor;
    a turbine blade coupled to a rotating shaft of an aircraft engine; and
    a controller, the controller coupled to the at least one sensor, the controller being configured to:
    receive a determined minimum creep life location (MCLL) for a turbine blade design, the MCLL being a location as to where minimum creep life occurs on the turbine blade design that fails fastest due to creep;
    via the at least one sensor, monitor a temperature of the MCLL for a turbine blade having the turbine blade design; and
    when the temperature of the MCLL exceeds a predetermined temperature threshold, send one or more first control signals to cause an adjustment of an operation of a temperature adjustment apparatus, the adjustment of the operation of the temperature adjustment apparatus being effective to cool a temperature of air flowing about the turbine blade as the aircraft engine is operating.

11. The system of claim 10, wherein the controller is configured to:
    determine a future prediction as to a future temperature at the MCLL based upon historical data; and
    when the future temperature at the MCLL exceeds the predetermined temperature threshold, send one or more second control signals to the temperature adjustment apparatus to adjust the temperature of the air flowing about the turbine blade as the aircraft engine is operating.

12. The system of claim 10, wherein the MCLL is determined based upon a stress analysis and a temperature of the turbine blade design.

13. The system of claim 10, wherein the temperature adjustment apparatus is configured to adjust the temperature of the air flowing about the turbine blade by adjusting a flow rate of the air.

14. The system of claim 13, wherein the temperature adjustment apparatus comprises a valve.

15. The system of claim 14, wherein the flow rate is adjusted by applying the one or more first control signals to the valve.

16. The system of claim 10, wherein the temperature adjustment apparatus comprises a heat exchanger.

17. The system of claim 10, wherein the at least one sensor comprises an infrared sensor.

18. The system of claim 10, wherein the at least one sensor is disposed on the turbine blade.

19. A non-transitory, machine-accessible storage medium having computer instructions and wherein the instructions are configured, when executed by a controller, to cause the controller to:
    receive a determined minimum creep life location (MCLL) for a turbine blade design, the MCLL being a location at which minimum creep life occurs on the turbine blade design that fails fastest due to creep;
    monitor a temperature of the MCLL on a turbine blade having the turbine blade design in an aircraft engine using at least one sensor; and when the temperature of the MCLL exceeds a predetermined temperature threshold, adjust a temperature of air flowing about the turbine blade as the aircraft engine is operating.

20. The non-transitory, machine-accessible storage medium of claim 19, wherein the controller is configured to determine a future prediction as to a future temperature at the MCLL based upon historical data and when the future temperature of the MCLL exceeds the predetermined temperature threshold, adjust the temperature of the air flowing about the turbine blade as the aircraft engine is operating.

* * * * *

UNITED STATES PATENT AND TRADEMARK OFFICE
CERTIFICATE OF CORRECTION

PATENT NO. : 11,913,387 B2
APPLICATION NO. : 17/703546
DATED : February 27, 2024
INVENTOR(S) : Minas et al.

It is certified that error appears in the above-identified patent and that said Letters Patent is hereby corrected as shown below:

In the Claims

In Column 11, Claim 1, Line 39, delete "a turbine blade" and insert -- the turbine blade --, therefor.

In Column 12, Claim 10, Line 17, delete "a turbine blade" and insert -- the turbine blade --, therefor.

In Column 12, Claim 19, Line 65, delete "a turbine blade" and insert -- the turbine blade --, therefor.

Signed and Sealed this
Twenty-first Day of May, 2024

Katherine Kelly Vidal
*Director of the United States Patent and Trademark Office*